UNITED STATES PATENT OFFICE.

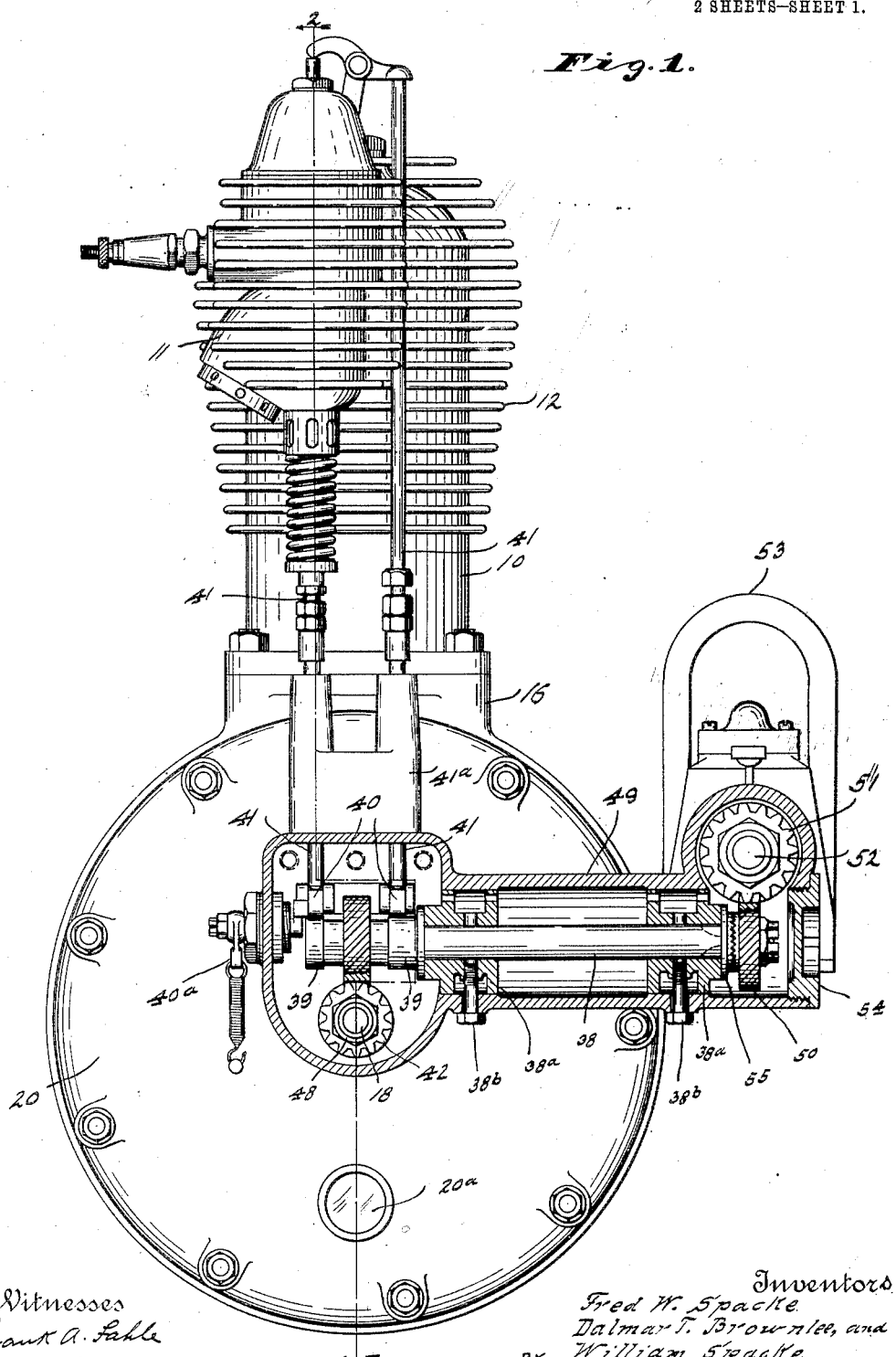

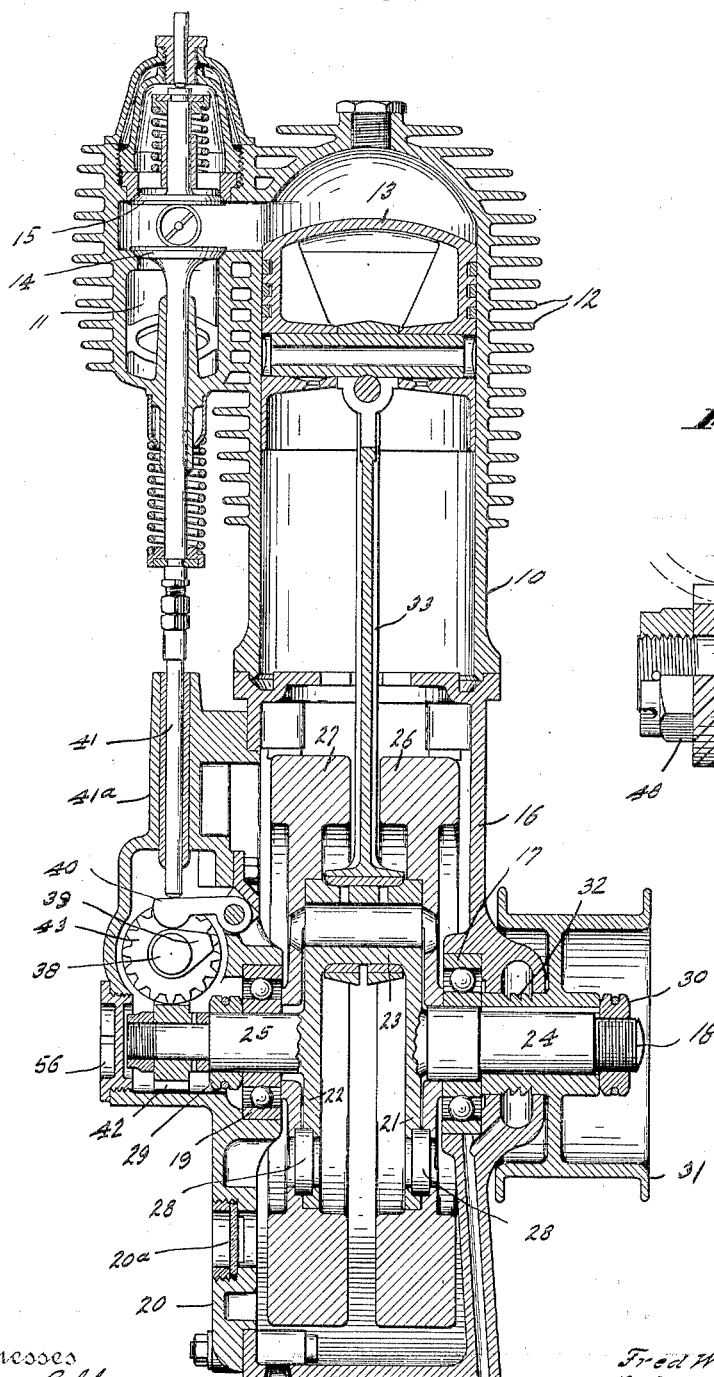

FRED W. SPACKE, DALMAR T. BROWNLEE, AND WILLIAM SPACKE, OF INDIANAPOLIS, INDIANA, ASSIGNORS TO THE F. W. SPACKE MACHINE COMPANY, OF INDIANAPOLIS, INDIANA, A CORPORATION OF INDIANA.

INTERNAL-COMBUSTION ENGINE.

1,108,265.  Specification of Letters Patent.  Patented Aug. 25, 1914.

Original application filed September 8, 1911, Serial No. 648,377. Divided and this application filed December 11, 1912. Serial No. 736,080.

*To all whom it may concern:*

Be it known that we, FRED W. SPACKE, DALMAR T. BROWNLEE, and WILLIAM SPACKE, citizens of the United States, residing at Indianapolis, in the county of Marion and State of Indiana, have invented a new and useful Internal-Combustion Engine, of which the following is a specification.

It is the object of our invention to simplify and cheapen, and at the same time to avoid certain disadvantages common in the construction of internal combustion motors, especially motor cycle motors.

To this end our invention involves a number of novel features which will be apparent from the description and drawings and will be particularly pointed out in the claims.

This application is a division of our copending application, Serial No. 648,377, filed September 8, 1911.

In the drawings, Figure 1 is an elevation of a motorcycle motor involving our invention; Fig. 2 is a section substantially on the line 2—2 of Fig. 1; and Fig. 3 is an enlarged detail view of the adjusting device for the valve cams.

The cylinder 10 and valve chamber 11 are preferably made integral and provided with the usual radiation ribs 12. Within the cylinder 10 and valve chamber 11 are the usual piston 13 and valves 14 and 15. Bolted to the lower or open end of the cylinder 10 is a crank case 16, which extends entirely across the end of the cylinder 10 and carries one bearing 17 for the crank shaft 18. The other bearing 19 for the crank shaft is carried by the cap 20, which is bolted to the crank case 16. The bearings 17 and 19 are preferably ball bearings. The crank case is usually filled with oil about to the level of the oil hole 20ᵃ in the cap 20. The joint between the cylinder 10 and crank case 16 extending entirely across the end of the cylinder, and the joint between the cap 20 and the crank case being at one side, such two joints do not intersect; as a result, the oil leakage almost inevitably present where there are intersecting joints is avoided.

The crank shaft, denoted in its entirety as 18, is an integral structure, and comprises two parallel coaxial disks 21 and 22 joined by an eccentric hollow shaft or crank pin 23 and provided with axial shaft sections 24 and 25 projecting from their remote faces. These shaft sections 24 and 25 fit within the bearings 17 and 19, respectively. Two fly-wheels 26 and 27 have disk-shaped depressions which fit over the disks 21 and 22. The fly-wheels and disks are locked against relative rotation movement by dowel disks 28 fitting in registering eccentric circular depressions in the adjacent surfaces of the disks 21 and 22 and the fly-wheels 26 and 27; and the fly-wheels, disks, and bearings are locked against relative axial movement by a single nut 29 on the shaft sections 25 and a single nut 30 bearing against the pulley 31 on the shaft section 24. This pulley may be provided with oil slingers 32 for preventing oil from the bearing 17 from getting on the belt.

On the hollow eccentric shaft 23 is mounted one end of a pitman 33, the other end of which is suitably pivoted to the piston 13. The pitman 33 works in the space between the rims of the fly-wheels 26 and 27. To balance the eccentric shaft 23 and the pitman 33, the rims of the fly-wheels are preferably made heavier on the side opposite said eccentric shaft.

Mounted at an angle, preferably a right angle, to the crank shaft 18, is a countershaft 38 carrying cams 39 for operating the valves 14 and 15 through suitable valve lifters 40 and valve rods 41, the latter being mounted in integral projections 41ᵃ on the cap 20. This countershaft 38 is driven by suitable gears 42 and 43 on the shaft section 25 and the countershaft respectively. The valve lifter 40 for the exhaust valve may be manually operated by a compression release handle 40ᵃ. In order conveniently to get the proper relative adjustment of the movements of the valves 14 and 15 and the piston 13, one face of the gear 42 is provided with teeth 44 which coöperate with similar teeth 45 fixed rotatively to this shaft. The teeth 45 are preferably located on a washer 46 bearing against a shoulder on the shaft section 25. In order to prevent the washer 46 from turning on the shaft section 25, the washer has one or more teeth or projections 47 which fit into corresponding slots in said shoulder. To adjust the position of the cams 39 and the operation of the valves 14 and 15, the nut 48 for holding the gear 42 in place is loosened sufficiently to disengage the teeth 44 and 45, the gear 42 is then turned to bring the cams and valves into proper position for the then position of the piston 13, and the nut 48 is tightened to cause the teeth 44 and 45 to engage. This furnishes a simple and convenient adjustment. The numbers of gear teeth and teeth 44 on the gear 42 are preferably relatively prime, as thereby the number of adjustments obtainable is equal to the product of such numbers of teeth. The washer 46 is made separate from the shaft section 25 because thereby the teeth 45 may be formed, and, if necessary, hardened, both more easily and more accurately.

The cam-bearing shaft 38 is mounted in bearings 38$^a$ within a transverse chamber 49 integral with the cap 20. The bearings are held in place by screws 38$^b$. On the end of the shaft 38 remote from the gear 43 is a gear 50, which meshes with a gear 51 on the shaft 52 of a magneto electric machine 53, provided for ignition purposes. By removing the cap 54 at the end of the chamber 49 and loosening the screws 38$^b$, the shaft 38, its bearings 38$^a$, and the parts carried by the shaft may be slipped out endwise. For timing the magneto, the gear 50 is made like the gear 42 and interlocks with a washer 55 similar to the washer 46. Access to the gears 42 and 50 is permitted by the caps 56 and 54.

The process of assembling is as follows:— The fly-wheel 26 is mounted on the disk 21 and the crank shaft 18 put in place in the bearing 17. The pulley 21 may now be put on and the disk, fly-wheel, bearing, and pulley all fastened together by the nut 30. Then, with the piston 13 in place in the cylinder 10 and the pitman 33 properly connected to the piston, the crank case 16 is bolted to the end of the cylinder 10. The free end of the pitman 33 is now properly clamped to the eccentric shaft 23, and the other fly-wheel 27 is put in place on the disk 22. Then the bearing 19 is put on the crank shaft and fastened in place by the nut 29; then the washer 46, gear 42, and nut 48 are put on, but the nut is preferably left loose. In the meanwhile, the parts carried by the cap 20, that is, the countershaft 38 and its bearings 38$^a$, the valve lifters 40, the valve rods 41, and the magneto 53 and its shaft 52, are preferably mounted in the cap 20; but the caps 54 and 56 are left off. Then the cap 20, with its parts mounted thereon, is put in place and bolted, the loosened nut 48 allowing the easy meshing of the gears 42 and 43. Then the gear 42 is adjusted, the nut 48 tightened, and the cap 56 put on. Finally the gear 50 is similarly adjusted and the cap 54 put in place.

Our invention is capable of wide modification, especially in its details. We therefore aim to cover all modifications which do not involve a departure from the spirit and scope of our invention as set forth in the following claims.

We claim as our invention:

1. In an internal combustion engine, the combination with a cylinder, piston, crank shaft, engine valves, and magneto, of a crank case, a cap for said crank case having an integral shaft chamber, a shaft mounted in said shaft chamber and driving said magneto and operating said valves, and gearing between said last named shaft and the crank shaft.

2. In an internal combustion engine, the combination with a cylinder, piston, crank shaft, engine valves, and magneto, of a crank case, a cap for said crank case having an integral shaft chamber, a shaft mounted in said shaft chamber and driving said magneto and operating said valves, said shaft being removable endwise from said shaft chamber, and gearing between said last named shaft and the crank shaft.

In witness whereof, we have hereunto set our hands and seals at Indianapolis, Indiana, this seventh day of December, A. D. one thousand nine hundred and twelve.

FRED W. SPACKE. [L. S.]
DALMAR T. BROWNLEE. [L. S.]
WILLIAM SPACKE. [L. S.]

Witnesses:
MAY LAYDEN,
G. B. SCHLEY.